(12) United States Patent  (10) Patent No.: US 8,238,958 B2
Bourlas et al.  (45) Date of Patent: Aug. 7, 2012

(54) METHOD, APPARATUS, AND SYSTEM FOR UPLINK MODULATION AND CODING SCHEME SELECTION

(75) Inventors: Yair Bourlas, San Diego, CA (US); Srikanth Gummadi, San Diego, CA (US); Xiaolong Huang, San Diego, CA (US)

(73) Assignee: Wi-LAN Inc., Ottawa (CA)

( * ) Notice: Subject to any disclaimer, the term of this patent is extended or adjusted under 35 U.S.C. 154(b) by 1153 days.

(21) Appl. No.: 12/101,852

(22) Filed: Apr. 11, 2008

(65) Prior Publication Data

US 2009/0258665 A1  Oct. 15, 2009

(51) Int. Cl.
*H04W 52/06* (2009.01)
*H04W 52/16* (2009.01)
(52) U.S. Cl. .......................................... 455/522; 455/69
(58) Field of Classification Search .................... None
See application file for complete search history.

(56) References Cited

U.S. PATENT DOCUMENTS

2007/0129094 A1* 6/2007 Jeong et al. .................. 455/522

* cited by examiner

*Primary Examiner* — Philip Sobutka
(74) *Attorney, Agent, or Firm* — Volpe and Koenig, P.C.

(57) ABSTRACT

The subject matter disclosed herein provides methods and apparatus, including computer program products, for selecting a modulation and coding scheme. In one aspect, there is provided a method. The method may receive information representative of a first normalized channel characteristic power associated with a downlink and receiving information representative of a second normalized channel characteristic power associated with an uplink. A predicted normalized channel characteristic power of the uplink may be determined based on the first normalized channel characteristic power and the second normalized channel characteristic power. Related systems, apparatus, methods, and/or articles are also described.

13 Claims, 9 Drawing Sheets

200

| 210 | RECEIVE INFORMATION REGARDING THE DOWNLINK (DL), THE RECEIVED INFORMATION ENABLING A DETERMINATION OF THE MEASURED DL NORMALIZED CHANNEL CHARACTERISTIC POWER (NCCP) |

| 220 | RECEIVE INFORMATION REGARDING THE UPLINK (UL), THE RECEIVED INFORMATION ENABLING A DETERMINATION OF THE MEASURED UL NCCP |

| 230 | DETERMINE PREDICTED UL NCCP |

METHOD, APPARATUS, AND SYSTEM FOR UPLINK MODULATION AND CODING SCHEME SELECTION

FIELD

The subject matter described herein relates to wireless communications.

BACKGROUND

Modulation is the process of encoding data onto a signal for transmission. Examples of modulation schemes include binary phased shift keying (BPSK), quadrature phase shift keying (QPSK), and quadrature amplitude modulation (QAM). Modulation schemes differ from one another according to the amount of data carried by any one symbol. Higher-order modulation schemes carry more data per symbol. For example, a 16 QAM symbol carries 4 bits of data per symbol, while a BPSK symbol carries only two bits of data per symbol. Thus, the higher-order modulation scheme, in this example 16 QAM, is more efficient in terms of the amount of data transferred over a wireless link in a fixed period of time. Thus, within a fixed period of time, more data can be transferred over the link using a higher-order modulation scheme than a lower-order modulation scheme if channel conditions are good. But transmissions using lower-order modulation schemes are more robust and result in fewer errors when channel conditions are poor.

Error correction codes enable the detection and correction of errors occurring during a wireless transmission. Examples of error correction codes that introduce elegant redundancy to the link, include convolution codes, convolution turbo codes, Reed-Solomon, Hamming, parity checks, repetition codes, and cyclic redundancy checks. Error correction codes are used to improve the performance of the wireless link. The code rate is the length of the original, unencoded information divided by the length of the coded information (e.g., 8 bits/16 bits or a ½-rate code). Increasing the amount of encoding (e.g., increasing the number of encoded bits per unencoded bit) increases robustness of the link. However, the redundancy providing robustness comes at the expense of efficiency since the use of error correction codes always decreases the efficiency of the wireless transmission given a fixed transmission time. Returning to the previous example, the ½-rate code decreases the efficiency by a factor of 2 since the ½-rate code uses 16 bits of coded information, while the unencoded information only uses 8 bits. Thus, within a fixed period of time, more data can be transferred, if channel conditions are good, over the link using a lower amount of error correction than a higher amount of error correction. But transmissions using a higher amount of error correction are more robust and result in fewer errors if channel conditions are poor.

SUMMARY

The subject matter disclosed herein provides methods and apparatus, including computer program products, for selecting a modulation and coding scheme.

In one aspect, there is provided a method. The method may include receiving information representative of a first normalized channel characteristic power associated with a downlink and receiving information representative of a second normalized channel characteristic power associated with an uplink. Moreover, a predicted normalized channel characteristic power of the uplink is determined based on the first normalized channel characteristic power and the second normalized channel characteristic power.

In another aspect, there is provided an apparatus. The apparatus includes means for receiving information representative of a first normalized channel characteristic power associated with a downlink and means for receiving information representative of a second normalized channel characteristic power associated with an uplink. Moreover, the apparatus includes means for determining a predicted normalized channel characteristic power of the uplink based on the first normalized channel characteristic power and the second normalized channel characteristic power.

In another aspect there is provided a system. The system includes a receiver which extracts information from a wireless link. Moreover, the system includes a modulation and coding selector which receives information from the receiver representative of a first normalized channel characteristic power associated with a downlink and which receives information representative of a second normalized channel characteristic power associated with an uplink, and which determines a predicted normalized channel characteristic power of the uplink based on the first normalized channel characteristic power and the second normalized channel characteristic power.

Variations of the noted aspects may include one or more of the following features. The determination of the predicted normalized channel characteristic power may include a contribution from the second normalized channel characteristic power that is greater than a contribution from the first normalized channel characteristic power, when the second normalized channel characteristic power information is initially received. The contribution of the second normalized channel characteristic power may be reduced and the contribution of the first normalized channel characteristic power may be increased based on an increasing amount of time elapsed from when the second normalized channel characteristic power information is received.

The predicted normalized channel characteristic power may be determined based on the following equation:

$$ENIP_{UL-predicted-moving} = \left( \frac{\alpha(ENIP_{DL}) + (1-\alpha)e^{-\beta\tau} ENIP_{UL-measured}}{\alpha + (1-\alpha)e^{-\beta\tau}} + ENIP_{offset} \right),$$

wherein $ENIP_{UL-predicted-moving}$ represents the predicted normalized channel characteristic power of the uplink, $ENIP_{DL}$ represents the first normalized channel characteristic power, $ENIP_{UL-measured}$ represents the second normalized channel characteristic power, $ENIP_{offset}$ represents a compensation factor, $\beta$ represents a time decay, $\alpha$ represents a weighting factor, e represents an exponential function, and $\tau$ represents an amount of time elapsed from when the second normalized channel characteristic power information is received.

The predicted normalized channel characteristic power may be determined based on the following equation:

$$ENIP_{UL-predicted-moving} =$$

$$\text{MIN}\left(\frac{\alpha(ENIP_{DL}) + (1-\alpha)e^{-\beta\tau}ENIP_{UL-measured}}{\alpha + (1-\alpha)e^{-\beta\tau}} + ENIP_{offset}, ENIP_{UL-MAX}\right),$$

wherein $ENIP_{UL-predicted-moving}$ represents the predicted normalized channel characteristic power of the uplink, MIN represents a minimum function, $ENIP_{DL}$ represents the first normalized channel characteristic power, $ENIP_{UL-measured}$ represents the second normalized channel characteristic power, $ENIP_{offset}$ represents a compensation factor, $ENIP_{UL-MAX}$ represents a cap on the value of $ENIP_{UL-predicted-moving}$, $\beta$ represents a time decay, a represents a weighting factor, e represents an exponential function, and $\tau$ represents an amount of time elapsed from when the second normalized channel characteristic power information is received. The compensation factor may be determined as a performance parameter determined based on a cyclic redundancy check (CRC) appended to a group of downlink packets.

The first normalized channel characteristic power associated with a downlink may be determined based on the following equation:

$ENIP_{DL} = P_{BS-per-tone} - CINR_{DL-measured}$, wherein $ENIP_{DL}$ represents the first normalized channel characteristic power, $P_{BS-per-tone}$ represents transmission power used by a base station, and $CINR_{DL-measured}$ represents a carrier to interference-plus-noise ratio (CINR) of the downlink.

The second normalized channel characteristic power may be determined based on the following equation:

$ENIP_{UL-instant} = P_{UL-instant} - CINR_{UL-instant}$, wherein $ENIP_{UL-instant}$ represents the second normalized channel characteristic power, $P_{UL\ instant}$ represents an uplink transmission power per tone, and $CINR_{UL-instant}$ represents a carrier to interference-plus-noise ratio of the uplink.

At least one of a modulation, a coding, and a quantity of allocation units to be used by a client station when transmitting data through the uplink to a base station may be determined based on the predicted normalized channel characteristic power.

The modulation and a coding to be used by a client station to transmit data to a base station may be determined based on the following equation:

$10 \log(N_{subcarrier} K) + (CINR(K,MCS) + ENIP_{UL-predicted}) > P_{available}(dBm)$ wherein log represents a base-10 logarithm, $N_{subcarrier}$ represents a quantity of subcarriers in an allocation unit, K represents a quantity of allocation units, CINR(K,MCS) represents a carrier to interference-plus-noise ratio (CINR) to support a modulation and a coding, $ENIP_{UL-predicted}$ represents the predicted normalized channel characteristic power of the uplink, and $P_{available}$ represents available power for transmission of data. The predicted normalized channel characteristic power of the uplink may be determined by determining a compensation factor, which is determined by a performance parameter based on a cyclic redundancy check (CRC) appended to a group of downlink packets.

In another aspect, there is provided a method. The method includes receiving packets over a first wireless link. A link performance parameter of the first wireless link may be determined based on the packets. The link performance parameter may be used to determine a modulation and coding scheme for a second wireless link.

In yet another aspect, there may be provided a method. The method includes transmitting packets through a first wireless link. A link performance parameter may be determined based on information regarding successful reception of the packets as received by a receiving unit. The link performance parameter may be used to determine a modulation and coding scheme for a second wireless link.

In another aspect, there is provided a method. The method includes transmitting a first set of packets through a first wireless link and receiving a second set of packets through a second wireless link. A combined link performance parameter may be determined based on combining information regarding successful reception of the second set of packets and information regarding successful reception of the first set of packets.

In another aspect, there is provided an apparatus. The apparatus includes a receiver configured to extract packets from a wireless link. In addition, a modulation and coding selector may be configured to receive the packets and determine, based on the packets, a link performance parameter, and use the link performance parameter to determine a transmission parameter for a second wireless link.

In still yet another aspect, there is provided an apparatus. The apparatus includes a transmitter configured to send packets over a downlink to an intended receiver. The apparatus also includes a modulation and coding selector configured to receive information regarding successful reception of the packets at the intended receiver and determine therefrom a link performance parameter, and use the link performance parameter to determine a modulation and coding scheme for an uplink.

In another aspect, there is provided an apparatus. The apparatus includes means for receiving packets over a first wireless link; means for determining, based on the packets, a link performance parameter of the first link; and means for using the link performance parameter to determine a transmission parameter for a second wireless link.

In another aspect, there is provided an apparatus. The apparatus includes means for transmitting packets through a first wireless link; means for determining a link performance parameter based on information regarding successful reception of the packets as received by a receiving unit; and means for using the link performance parameter to determine a transmission parameter for a second wireless link.

In yet another aspect, there is provided an apparatus. The apparatus includes means for transmitting a first set of packets through a first wireless link; means for receiving a second set of packets through a second wireless link; and means for determining a combined link performance parameter based on combining information regarding successful reception of the second set of packets and information regarding successful reception of the first set of packets.

In another aspect, there is provided one or more computer readable medias storing executable instructions that when executed perform a method including receiving packets over a first wireless link; determining, based on the packets, a link performance parameter of the first link; and using the link performance parameter to determine a transmission parameter for a second wireless link.

In another aspect, there is provided one or more computer readable medias storing executable instructions that when executed perform a method including transmitting packets through a first wireless link; determining a link performance parameter based on information regarding successful reception of the packets as received by a receiving unit; and using the link performance parameter to determine a modulation and coding scheme for a second wireless link.

Variations of the noted aspects may include one or more of the following features. Receiving the packets may include receiving a cyclic redundancy check (CRC) associated with each of the packets. The link performance parameter may be determined based on packet error rate information derived from the CRC. Moreover, determining the link performance parameter may further include determining a time weighted error rate performance metric by multiplying a unitless weighting factor times a first quantity of packets successfully received without errors and dividing by a total quantity of packets received to determine a first result; multiplying a quantity times a previously determined value of the time weighted error rate performance metric to determine a second result; and subtracting the first result from the second result. A supplemental channel characteristic parameter may be determined by multiplying a value range for the supplemental channel characteristic parameter by the time weighted error rate performance metric and adding thereto a bias value. A cyclic redundancy check (CRC) may be associated with each of the transmitted packets. Moreover, the link performance parameter determination may further include determining a ratio of a first quantity representative of packets successfully received at the receiving unit and a second quantity representative of a total quantity of packets transmitted through the first wireless link. The determination of the combined link performance parameter may include determining a time weighted error rate performance metric by multiplying a unitless weighting factor times a first quantity of packets successfully received without errors and dividing by a total quantity of packets received to determine a first result; multiplying a quantity times a previously determined value of the time weighted error rate performance metric to determine a second result; and subtracting the first result from the second result. The modulation and coding scheme for the first wireless link may be selected based on the combined link performance parameter. The modulation and coding scheme for the second wireless link may be selected based on the combined link performance parameter.

The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 2 depicts a process 200 for determining a predicted uplink normalized channel characteristic power (NCCP);

Figure 1:
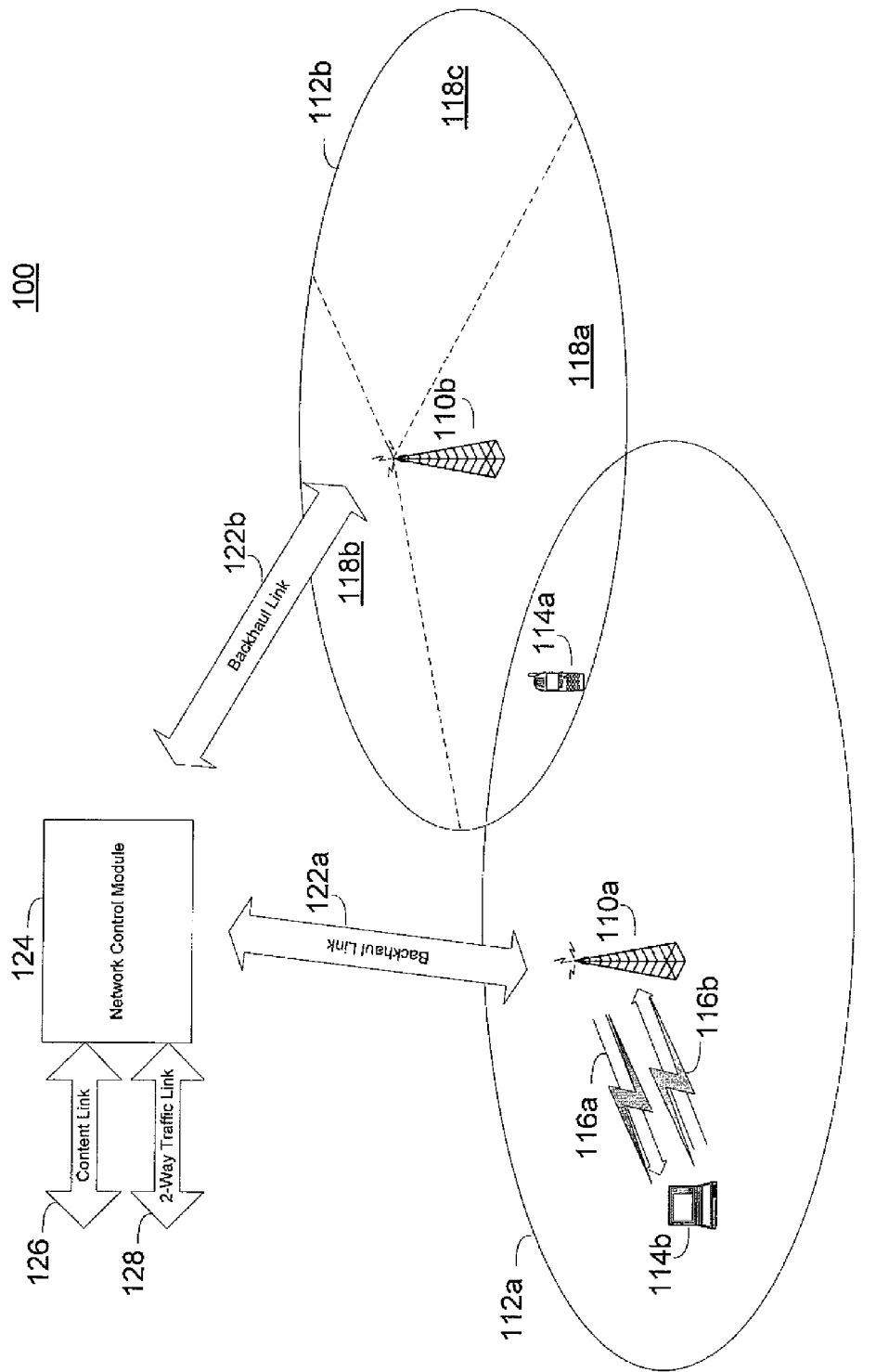
FIG. 1 depicts an example of a network including a client station and a base station.

Like labels are used to refer to same or similar items in the drawings.

DETAILED DESCRIPTION

FIG. 1 is a simplified functional block diagram of a wireless communication system 100. The wireless communication system 100 includes a plurality of base stations 110*a* and 110*b*, each supporting a corresponding service or coverage area 112*a* and 112*b*. The base stations are capable of communicating with wireless devices within their coverage areas. For example, the first base station 110*a* is capable of wirelessly communicating with a first client station 114*a* and a second client station 114*b* within the coverage area 112*a*. The first client station 114*a* is also within the coverage area 112*b* and is capable of communicating with the second base station 110*b*. In this description, the communication path from the base station to the client station is referred to as a downlink 116*a* and the communication path from the client station to the base station is referred to as an uplink 116*b*.

Although for simplicity only two base stations are shown in FIG. 1, a typical wireless communication system 100 includes a much larger number of base stations. The base stations 110*a* and 110*b* can be configured as cellular base station transceiver subsystems, gateways, access points, radio frequency (RF) repeaters, frame repeaters, nodes, or any wireless network entry point.

The base stations 110*a* and 110*b* can be configured to support an omni-directional coverage area or a sectored coverage area. For example, the second base station 110*b* is depicted as supporting the sectored coverage area 112*b*. The coverage area 112*b* is depicted as having three sectors, 118*a*, 118*b*, and 118*c*. The second base station 110*b* typically treats each sector 118 as effectively a distinct coverage area.

Although only two client stations 114*a* and 114*b* are shown in the wireless communication system 100, typical systems are configured to support a large number of client stations. The client stations 114*a* and 114*b* can be mobile, nomadic, or stationary units. The client stations 114*a* and 114*b* are often referred to as, for example, mobile stations, mobile units, subscriber stations, wireless terminals, or the like. A client station can be, for example, a wireless handheld device, a vehicle mounted device, a portable device, client premise equipment, a fixed location device, a wireless plug-in accessory, or the like. In some cases, a client station may take the form of a handheld computer, notebook computer, wireless telephone, personal digital assistant, wireless email device, personal media player, meter-reading equipment, or the like and may include a display mechanism, microphone, speaker, and memory.

In a typical system, the base stations 110*a* and 110*b* also communicate with each other and a network control module 124 over backhaul links 122*a* and 122*b*. The backhaul links 122*a* and 122*b* may include wired and wireless communication links. The network control module 124 provides network administration and coordination as well as other overhead, coupling, and supervisory functions for the wireless communication system 100.

In some aspects, the wireless communication system 100 can be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network but may have limited or no ability to provide information to the network. Applications operating over the unidirectional communications channel include broadcast and multicast applications. In one aspect, the wireless system 100 supports both bidirectional and unidirectional communications. In this case, the network control module 124 is also coupled to external entities via, for example, content link 126 and two-way traffic link 128.

In one example, the wireless communication system 100 is configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE), or it may be a proprietary system. The subject matter described herein is not limited to application to OFDMA systems or to the noted standards and specifications. The description in the context of an OFDMA system is offered for the purposes of providing a particular example only.

As used herein, IEEE 802.16 refers to one or more specifications, such as the Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, and any subsequent additions to the IEEE 802.16 series of specifications.

In some aspects, downlink 16a and uplink 116b each represent a radio frequency (RF) signal. The RF signal may include data, such as voice, video, images, Internet Protocol (IP) packets, control information, and any other type of information. When IEEE-802.16 is used, the RF signal may use OFDMA. OFDMA is a multi-user version of orthogonal frequency division multiplexing (OFDM). In OFDMA, multiple access is achieved by assigning to an individual client station a group of OFDM tones. These tones are often referred to as subcarriers. The groups of subcarriers are sometimes referred to as subchannels or, more generically, as allocation units When base station 110a communicates with client station 114b, downlink 116a and uplink 116b are each affected by various channel characteristics, such as noise, interference, fading, shadowing, multipath, Doppler, path loss, and the like. In the case of noise and interference, downlink 116a and uplink 116b experience different levels of noise and interference. For example, when client station 114a is on the fringe of its coverage area, client station 114a encounters its most significant downlink interference from neighboring base station 110b. As such, the measured downlink interference at client station 114a is often dominated by interference from neighboring base station 110b. In contrast, because neighboring base stations do not transmit during the uplink portion of the frame, neighboring base stations do not add interference to the uplink. On the uplink, the most common source of interference is the mutual interference of client stations operating within the coverage area of a common base station.

On the other hand, some channel characteristics, such as path loss, multipath, fading, Doppler, and shadowing are typically about the same for downlink 116a and uplink 116b. For example, Doppler, which is a function of the speed at which the client station is traveling relative to the base station, is typically the same for both the downlink and the uplink.

In typical systems, base station 110a regularly communicates with client station 114b via downlink 116a, sending broadcast messages that can be monitored by a client station in every frame. However, client station 114b typically communicates less frequently on uplink 116b—making it more difficult to predict the performance of uplink 116b when compared to downlink 116a.

The prediction of channel characteristics affects the selection of a modulation and coding scheme best suited to the current channel conditions. For example, if the channel characteristics of uplink 116b are good (e.g., little noise, interference, and the like), base station 110a typically directs client station 114b to transmit a frame of data via uplink 116b using an efficient higher-order modulation scheme, such as 64 QAM and lower amount of error encoding, such as ¾-rate coding. However, if during another frame, channel characteristics change (e.g., client station 114b changes location and thus encounters greater noise, interference, and the like), base station 110a typically directs client station 114b to transmit a frame of data via uplink 116b using a more robust lower-order modulation scheme, such as QPSK, and a more robust error correction code, such as ½-rate coding, rep 2. The phrase "rep 2" means that the ½-rate encoded bits are transmitted two times for additional robustness.

According to 802.16e, client station 114b measures, typically in dB, the carrier to interference noise ratio (CINR) and reports the measured downlink CINR (i.e., $CINR_{DL\text{-}measured}$) back to base station 110a in a downlink CINR measurement report (DCMR) message sent via a fast feedback channel. To predict the downlink channel characteristics, base station 110a uses the measurement information in the DCMR to select the modulation and coding scheme combination used in subsequent transmissions to client station 114b on the downlink.

CINR is calculated by dividing the power of the carrier by the power of the interference and noise. As such, if the interference level remains constant and the power level of the carrier decreases, the CINR will decrease. Because in an OFMDA system the power in each uplink subcarrier is dependent on the number of subcarriers used, the value of CINR, as measured by the base station, can vary from frame to frame even if the interference level remains constant. Selection of the modulation and coding scheme should be based on the level of interference and noise that the link is currently experiencing (as well as the supplement channel characteristics described below) and, thus, should not be based directly on the CINR. Therefore, in order to determine a normalized channel characteristic power (NCCP) parameter that remains valid from frame to frame even if the power per subcarrier changes, the power at which transmissions are made should be taken into account. The NCCP provides an absolute measure of the noise and interference power independent of the power in the carrier.

In one aspect, the modulation and coding scheme is selected based on a specific NCCP parameter described herein as an equivalent noise interference power (ENIP). ENIP is a metric that reflects the power of the noise and interference and, as such, is not susceptible to the frame-to-frame power per tone variations that typically plague CINR. The ENIP thus represents a parameter that remains valid even when the power per tone varies from frame to frame. In this sense, the ENIP is "normalized" for the power variations of the carriers. In some aspects, the ENIP is used to select a modulation and coding scheme for a link (e.g., an uplink or a downlink) associated with IEEE 802.16, although other types of links may be used as well. Although ENIP is an example of an NCCP parameter, in other aspects, the modulation and coding scheme selection process is based on other types of NCCP parameters. For example, in some systems, the channel characteristics are measured based on parameters other than CINR, such as signal-to-noise ratio (SNR), energy per bit over noise power density ($E_b/N_o$), and the like. In each case, the NCCP is determined by normalizing the relative measurements with respect to the power in the relevant portion of the desired signal to determine an absolute measure of the noise and interference.

When base station 110a receives the measured downlink CINR of downlink 116a, base station 110a uses the measured downlink CINR and other parameters to select a modulation and coding scheme for use on data transmitted via downlink 116a. Under many common operating conditions, communication via downlink 116a occurs regularly. As such, the measured downlink CINR of downlink 116a can be used to predict the performance of downlink 116a and make a corresponding modulation and coding scheme selection. In some aspects, base station 110a determines a measured downlink ENIP based on the measured downlink CINR as shown in the following equation:

$$ENIP_{DL} = P_{BS} - CINR_{DL\text{-}measured} \qquad \text{Equation 1,}$$

wherein:

$ENIP_{DL}$ is the measured downlink ENIP typically expressed in units dBm;

$P_{BS}$ is transmission power used by base station 110a when transmitting to client station 114b during the frame corresponding to the measured downlink CINR, typically expressed in units of dBm; and $CINR_{DL\text{-}measured}$ is the measured downlink CINR, as measured (typically in dB) by client station 114b and reported back to base station 110a.

In the case of uplink 116b, selection of a modulation and coding scheme for use on uplink 116b is more of a challenge than the above-described modulation and coding scheme selection for downlink 116a. Under many common operating conditions, client station 114b does not continually transmit via uplink 116b. For example, unlike the regular and frequent downlink transmissions by base station 110a to client station 114b, client station 114b typically transmits lengthy messages to base station 110a only when client station 114b has data to send to base station 110a. Thus, a significant amount of time can elapse between transmissions from client station 114b to base station 110a. In this period of time, the channel characteristics of uplink 116b may vary. When channel characteristics vary, any previous measurements of the channel characteristics are not indicative of the performance of uplink 116b. Thus, any measured characteristics, such as the measured uplink CINR (i.e., the CINR of the uplink as measured by the base station), may be considered "stale" as time elapses from when the measurement is determined. These stale measurements are less likely to provide an accurate prediction of the performance of uplink 116b and, as such, any corresponding selection of a modulation and coding scheme for uplink 116b based on a stale measurement may not be well suited to the uplink's current channel characteristics.

In some aspects, the NCCP is determined for uplink 116b. As noted above, NCCP refers to a measure of the power of the noise and interference associated with a link, such as uplink 116b. Moreover, the NCCP is considered an absolute indication of the power of the noise and interference of a link since it is independent of the power per tone variations of the carrier. In some of the examples described herein, an ENIP is used as the NCCP, although other parameters may be used to represent NCCP as well.

The ENIP of uplink 116b (referred to herein as an instantaneous uplink ENIP) is typically determined whenever base station 110a determines a measured uplink CINR. The base station 111a determines the measured uplink CINR by making a CINR measurement when client station 114b transmits to base station 110a for a sufficient amount of time (e.g., with a lengthy message) to enable a measurement.

After a measured uplink CINR is determined by base station 110a, base station 110a determines the instantaneous uplink ENIP of uplink 116b. The instantaneous uplink transmission power is reported by client station 114b to base station 110a every few frames. Between reports, the instantaneous uplink transmission power is calculated using Equation 2 below.

In some aspects, the instantaneous uplink ENIP is determined based on the following equation:

$$ENIP_{UL\text{-}instant}(dBm) = P_{UL\text{-}instant}(dBm) - CINR_{UL\text{-}instant}(dB) \qquad \text{Equation 2,}$$

wherein:

$ENIP_{UL\text{-}instant}$ is the instantaneous uplink ENIP;

$P_{UL\text{-}instant}$ is the instantaneous uplink transmission power per tone used by client station 114b to transmit to base station 110a for the most recent frame, either reported or estimated with Equation 3 below; and $CINR_{UL\text{-}instant}$ is the measured uplink CINR determined by base station 110a.

The instantaneous uplink ENIP of Equation 2 provides a parameter that remains valid from frame to frame even when the power per tone changes. For example, base station 110a typically includes a modulation and coding selector module (described further below with respect to FIG. 9) for determining instantaneous uplink ENIP using received parameters, such as instantaneous uplink transmission power and measured uplink CINR, which is measured by a channel measurement module (described further below with respect to FIG. 9) at base station 110a.

When the instantaneous uplink transmission power is not reported by client station 114b to base station 110a, base station 110a typically estimates the uplink transmission power based on the following equation:

$$P_{UL\text{-}instant\text{-}n}(dBm) = ENIP_{UL\text{-}measured\text{-}moving\text{-}(n-1)}(dBm) + CINR_{required\text{-}(n-1)}(dB) \qquad \text{Equation 3,}$$

wherein:

$P_{UL\text{-}instant\text{-}n}$ is an estimate of the instantaneous uplink transmission power per tone for the most recent frame;

$CINR_{required\text{-}(n-1)}$ is the required CINR (described further below with respect to column 4 of Table 1) for the modulation and coding scheme used on a previous frame of data; and $ENIP_{UL\text{-}measured\text{-}moving\text{-}(n-1)}$ is the measured uplink ENIP for a previous frame, as described further below with respect to Equation 4.

The measured uplink ENIP corresponds to a moving, weighted average of the instantaneous uplink ENIP. In some aspects, the measured uplink ENIP is determined based on the following equation:

$$ENIP_{UL\text{-}measured\text{-}moving\text{-}n} = (1-\gamma) \times ENIP_{measured\text{-}moving\text{-}(n-1)} + \gamma \times ENIP_{UL\text{-}instant\text{-}n} \qquad \text{Equation 4,}$$

wherein:

$ENIP_{UL\text{-}measured\text{-}moving\text{-}n}$ represents the $n^{th}$ value of the measured uplink ENIP;

$\gamma$ is a weighting factor;

n is an index;

$ENIP_{UL\text{-}measured\text{-}moving\text{-}(n-1)}$ represents a previous value of the measured uplink ENIP; and $ENIP_{UL\text{-}instant\text{-}n}$ represents the $n^{th}$ value of the instantaneous uplink ENIP.

To illustrate by way of an example, each time another measured uplink CINR is measured by a channel measurement module at base station 110a, base station 110a uses Equations 2 and 4 to determine for uplink 116b an instantaneous uplink ENIP and a measured uplink ENIP (e.g., $ENIP_{UL\text{-}measured\text{-}moving\text{-}n}$). However, when the channel measurement module at base station 110a is not able to accurately determine the measured uplink CINR due to infrequent or short duration uplink transmissions, the measured uplink ENIP of uplink 116b can become a stale measurement and is no longer an accurate predictor of uplink performance. Therefore, the modulation and coding selector module at base station 110a determines a predicted uplink ENIP as a combination of the measured uplink ENIP and the measured downlink ENIP. The combination is based on how stale these measurements are. Specifically, when the measured uplink ENIP is a recent measurement, measured uplink ENIP is more likely to be a better estimate of the actual uplink ENIP. As time elapses, the measured downlink ENIP is more likely to be a better estimate of the actual uplink ENIP due to the somewhat symmetrical channel characteristics of the uplink and the downlink. As such, when the measured uplink ENIP is a relatively recent measurement, the contribution of the measured uplink ENIP to predicted uplink ENIP dominates. As time elapses, however, the measured uplink ENIP becomes increasingly stale, and the contribution of the measured downlink ENIP to predicted uplink ENIP increases and over time dominates.

Base station 110a determines the predicted uplink ENIP of uplink 116b based on the measured uplink ENIP of uplink 116b (e.g., as described above with respect to Equation 4) and the measured downlink ENIP of downlink 116a (e.g., as described above with respect to Equation 1). In some aspects, base station 110a determines the predicted uplink ENIP based on the following equation:

$$ENIP_{UL\text{-}predicted\text{-}moving} = \text{MIN}\left(\frac{\alpha(ENIP_{DL}) + (1-\alpha)e^{-\beta\tau}ENIP_{UL\text{-}measured}}{\alpha + (1-\alpha)e^{-\beta\tau}} + ENIP_{offset}, ENIP_{UL\text{-}MAX}\right), \quad \text{Equation 5}$$

wherein:

$ENIP_{UL\text{-}predicted\text{-}moving}$ is the predicted uplink ENIP of uplink 116b in dBm;

MIN(x,y) represents a minimum function to select a minimum of the value within the parenthesis (e.g., the larger of the left hand side of the comma (x) or the right hand side of the comma (y));

α is a unitless weighting factor (e.g., 0.1);

β is a time decay constant typically specified in units of 1/seconds (e.g., 25);

τ is the elapsed time since the most recent measured uplink CINR typically measured in seconds;

$ENIP_{DL}$ is the measured downlink ENIP of downlink 116a determined, for example, according to Equation 1 in dBm;

e is the exponential function;

$ENIP_{UL\text{-}measured}$ is the measured uplink ENIP when Equation 4 is calculated in dBm;

$ENIP_{offset}$ is a compensation factor calculated, for example, according to Equation 6 below in dBm; and $ENIP_{UL\text{-}MAX}$ is a cap on the value of predicted uplink ENIP in dBm.

After the predicted uplink ENIP is determined using Equation 5, the predicted uplink ENIP is used to determine the modulation and coding scheme of uplink 116b. In one aspect of the invention, the minimum function is not used.

Figure 9:
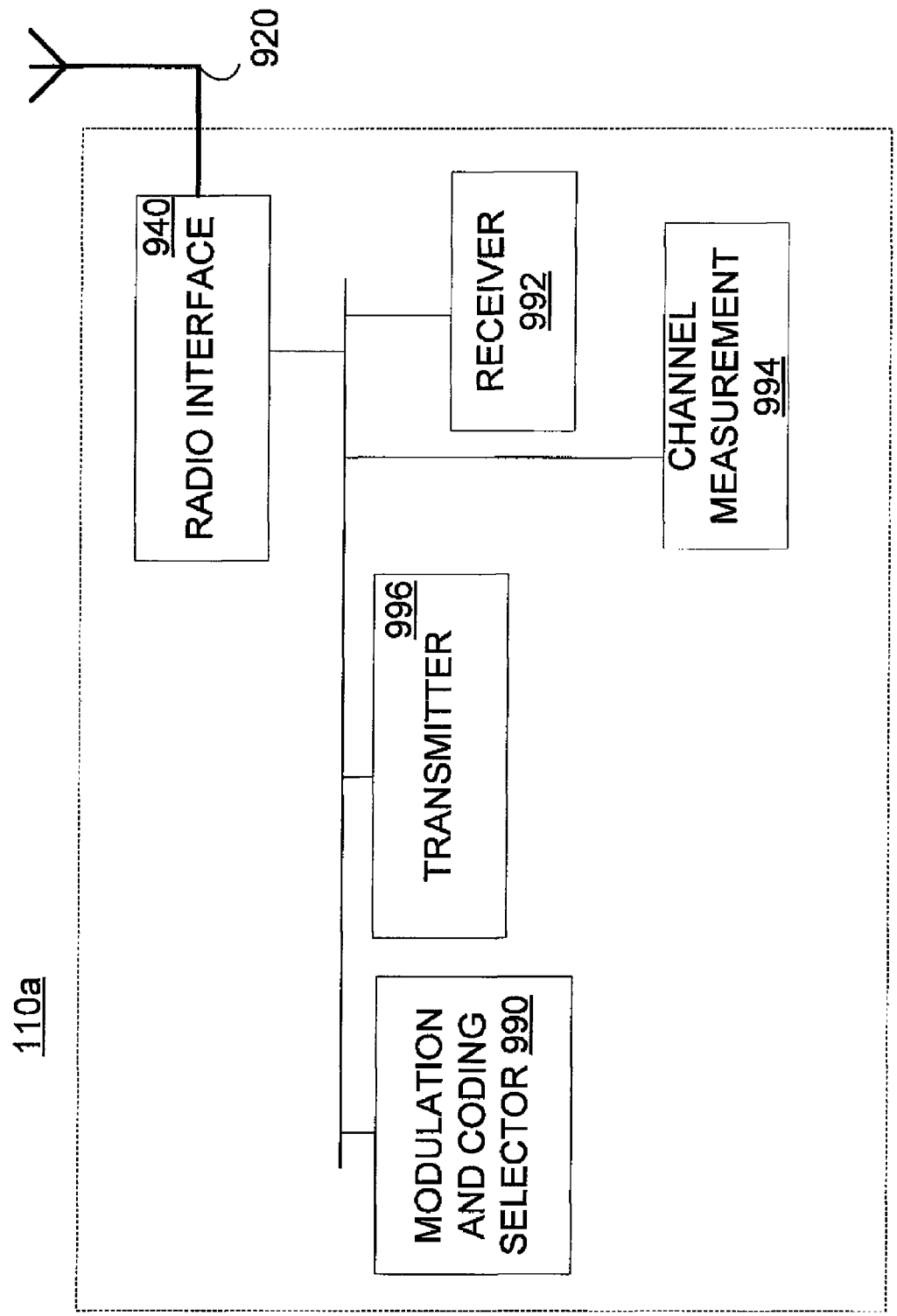
FIG. 9 depicts an example of a base station.

FIG. 2 depicts an exemplary process 200 for determining predicted uplink ENIP. FIG. 9, described further below, depicts a block diagram of an exemplary base station, such as base station 110a. FIGS. 2 and 9 are used below to illustrate exemplary aspects consistent with the invention.

At 210, a modulation and coding selector module 990 at base station 110a receives through uplink 116b channel characteristic information regarding downlink 116a. For example, an uplink message is received by base station 110a via antenna 920 and radio interface 940 containing an indication of a CINR measurement made by client station 114b. Radio interface 940 converts the wireless link signal to a decoded digital signal and provides it to receiver module 992, which in turn extracts the carried information and provides this information to the various components within the base station 110a. For example, receiver 992 provides information with respect to the channel characteristics information to modulation and coding selector module 990. Moreover, a transmitter 996 module at base station 110a sets the downlink transmission power used by base station 110a to transmit data to client station 114b. The modulation and coding selector module 990 receives the downlink transmission power indication of downlink 116a from the transmitter module 996. The modulation and coding selector module 990 uses the downlink channel characteristic information and the downlink transmission power indication to determine a measured normalized channel characteristic power (NCCP) for the downlink by, for example, determining a measured downlink ENIP (e.g., using Equation 1), although other parameters may be used to determine NCCP.

At 220, the modulation and coding selector module 990 at base station 110a receives channel characteristic information regarding uplink 116b to determine a measured NCCP of uplink 116b. For example, the modulation and coding selector module 990 receives from channel measurement module 994 at base station 110a the measured uplink CINR of uplink 116b. Moreover, the modulation and coding selector module 990 receives the instantaneous uplink transmission power (e.g., power per tone) that either is reported by client station 114b by the channel measurement module 994 at base station 110 or estimated using Equation 3. For example, an uplink message, such as a DCMR, is received by base station 110a via antenna 920 and radio interface 940, the uplink message including an indication of a transmission power used by client station 114b. Radio interface 940 converts the wireless link signal to a decoded digital signal and provides it to receiver module 992, which in turn extracts and provides corresponding information to modulation and coding selector 990. The modulation and coding selector module 990 uses the uplink channel characteristic information and the uplink transmission power indication to a determine a measured NCCP for the uplink by, for example, determining a measured uplink ENIP using Equation 4, although other parameters may be used to determine NCCP.

At 230, the modulation and coding selector module 990 at base station 110a uses the measured NCCP for the uplink and the downlink to determine the predicted NCCP of uplink 116b. In some aspects, the modulation and coding selector module 990 determines the predicted NCCP of uplink 116b by, for example, determining the predicted uplink ENIP using Equation 5, although other approaches to determine NCCP and ENIP may be used as well. When the measured uplink NCCP is a recent measurement (e.g., the value of τ is a small), the contribution of the measured uplink NCCP dominates the predicted uplink NCCP. As time elapses and the measured uplink NCCP becomes increasingly stale, the contribution of the measured downlink NCCP to predicted uplink NCCP increases and over time dominates the predicted uplink NCCP.

Figure 3:
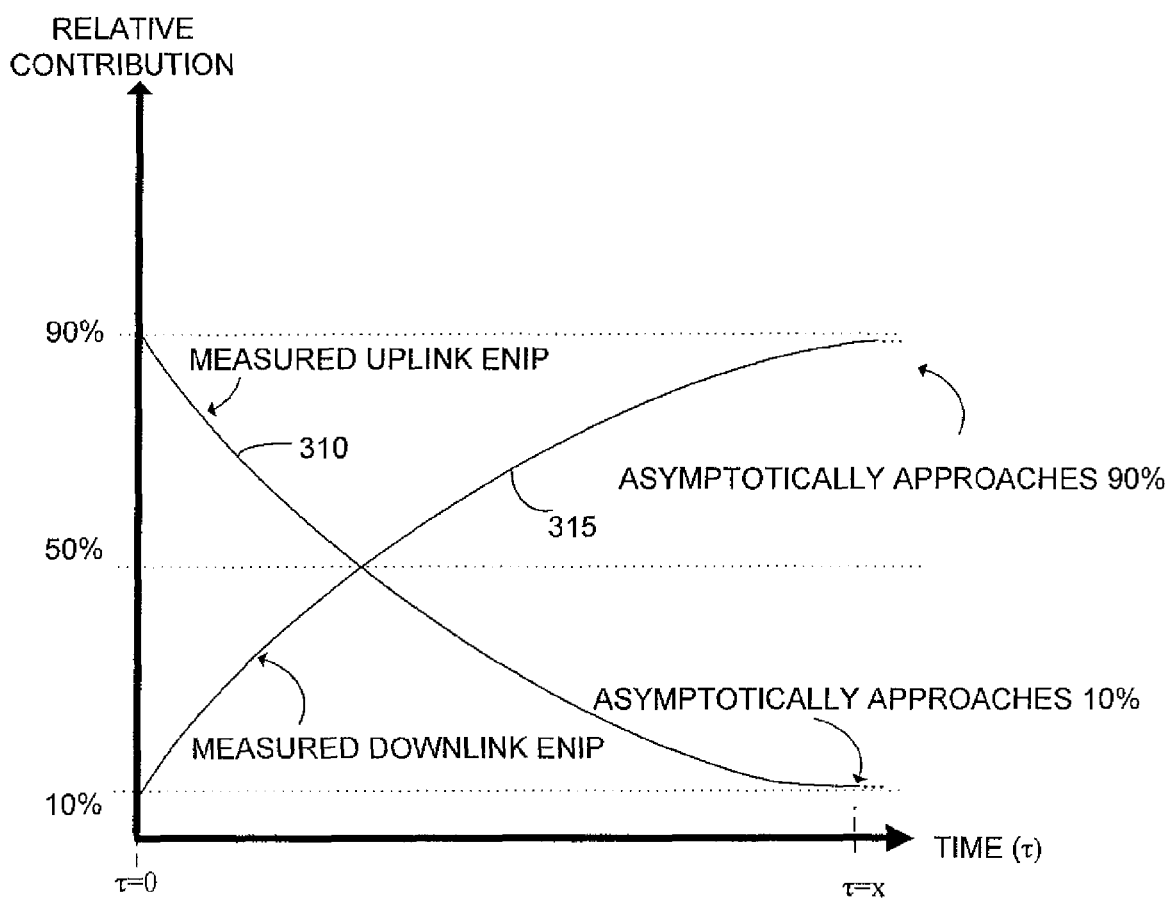
FIG. 3 is a plot depicting aspects contributing to predicted uplink ENIP.

FIG. 3 plots the percentage contribution of measured uplink ENIP 310 and measured downlink ENIP 315 to predicted uplink ENIP at any given time τ, according to Equation 5. For example, the predicted uplink ENIP of uplink 116b represents a combination including a contribution from measured uplink ENIP and another contribution from measured downlink ENIP. Initially (e.g., at τ=0), according to sample values given in Equation 5, the predicted uplink ENIP includes a 90% contribution from measured uplink ENIP and a 10% contribution from measured downlink ENIP. As time elapses and the measured uplink ENIP becomes a stale measurement, the contribution of measured uplink ENIP decreases, while the contribution from measured downlink ENIP increases. For example, as the lapsed time τ gets very large, the predicted uplink ENIP includes a 10% contribution from measured uplink ENIP and a 90% contribution from measured downlink ENIP. Although FIG. 3 is described with respect to ENIP, a plot of the percentage contribution of measured uplink NCCP and measured downlink NCCP to predicted uplink NCCP at any given time τ would yield similar results to the ENIP case described above and depicted at FIG. 3.

In some aspects, determining predicted uplink ENIP based on a contribution from measured uplink ENIP and measured downlink ENIP (e.g., as described with respect to Equation 4 and FIG. 3) provides enhanced channel characterization and thus enhanced modulation and coding scheme selection, especially in the case of an uplink that is infrequently used and/or carries transmissions of a short duration, when compared to a downlink.

In some aspects, the modulation and coding selector module at base station 110a determines, the predicted uplink ENIP of uplink 116b based on Equation 5 whenever a modulation and coding scheme selection is required, such as in response to an allocation request received at the base station 110a from client station 114b.

The determination of predicted uplink ENIP typically uses the compensation factor $ENIP_{Offset}$, although in some aspects the compensation factor may be omitted from Equation 4. The compensation factor corrects the predicted uplink ENIP of Equation 4 based on past link performance. For example, Equation 6 uses uplink data error rate statistics to determine a compensation factor as follows:

$$ENIP_{Offset} = -ENIP_{offset-dynamic-range} \times T_{Ave} + B_{Bias} \quad \text{Equation 6,}$$

wherein:

$ENIP_{offset}$ is the compensation factor in dBm;

$ENIP_{offset-dynamic\ range}$ represents a range of values that can be used for the compensation factor in dBm;

$B_{Bias}$ represents a bias value providing a fixed offset to the compensation factor, typically used to center the average performance around a zero value, and has units of dB;

$T_{Ave}$ is the value of $T_{aven}$ at the time the determination (e.g., calculation) of Equation 5 is made and is unitless; and $T_{aven}$ is a time weighted error rate performance metric determined by the following equation:

$$T_{aven} = \mu \times \frac{N_{Goodn}}{N_{Totaln}} + (1-\mu) \times T_{aven-1}, \quad \text{Equation 7}$$

wherein:

μ is a unitless weighting factor having a value between 0 and 1;

$N_{Goodn}$ is the number of successfully received data blocks;

$N_{Totaln}$ is the total number of received data blocks; and $T_{aven-1}$ is a previous value of $T_{aven}$.

The phrase "data block" refers to one or more sets of data for which a determination of successful reception can be determined. The data blocks can be physical (PHY) layer data blocks or medium access (MAC) layer data blocks. For example, for HARQ data connections, the data blocks can be slots and the ratio can be the number of good slots received in frame n to the total number of slots in frame n. Alternatively, for Non-HARQ data connections, the data blocks can be packets and the ratio can be the number of successfully received packets in frame n to the total number of packets transmitted in frame n. The compensation factor is typically determined based on statistical performance data associated with the link.

Once a predicted uplink NCCP is determined (e.g., using predicted uplink ENIP and Equation 5), the modulation and coding selector module at base station 110a determines, based on the predicted uplink NCCP, a modulation and coding scheme. For example, the modulation and coding scheme selector module 990 may select a modulation and coding scheme that is more robust when the predicted uplink NCCP reflects relatively poor channel characteristics (e.g., a high level of noise and interference) and a more efficient modulation and coding scheme when the predicted uplink NCCP reflects relatively good channel conditions. In some aspects, the modulation and coding selector module 990 determines, based on the value of the predicted uplink NCCP, a modulation and coding scheme from a table of predetermined modulation and coding schemes. Moreover, the modulation and coding selector module 990 can also determine a so-called "mapped pair" comprising the modulation and coding scheme and a corresponding number of allocation units. As noted above, a base station assigns to a client station groups of OFDM tones for use on the uplink. The base station typically assigns the tones in groups of fixed size. These groups are some times referred to as subchannels or, more generically, as allocation units. For example, according to 802.16, whenever client station 114b has data queued for transmission over the uplink 116b, the client station 114b makes a request for an allocation to the base station 110a, specifying the amount of data to be sent by the client station 114b.

In some aspects, a lookup table, such as Table 1 below, is created to specify the required CINR (column 4) to support a mapped pair comprising an allocation unit (column 2) and a modulation and coding scheme (column 3). Table 1 also shows the amount of data (labeled at column 5 as "DATA LOAD IN BITS") that can be carried by each mapped pair. For example, in the second row of Table 1, one allocation unit and the modulation coding scheme QPSK with ½-rate error correction coding form a mapped pair. The mapped pair of the second row requires a CINR of 2 dB. Moreover, when using this mapped pair, 240 bits of data may be sent by the client station to the base station via the uplink.

Although Table 1 illustrates one exemplary set of values in columns 2-5, other table values may be used in Table 1 as well as a table with more or fewer entries. Moreover, base station 116a typically includes a plurality of tables of modulation and coding scheme pairs. Moreover, base station 116a can include tables of modulation and coding scheme pairs for different types of data connections and different types of links. For example, base station 110a can include a table of modulation and coding scheme pairs for HARQ connections and another table of modulation and coding scheme pairs for non-HARQ connections. Base station 116a can also have a table of modulation and coding scheme pairs for the uplink and another table for the downlink.

In some aspects, no formal table is used, so that the system can freely select from a large range of modulation techniques and coding techniques as well as allocation units. For example, LTE does not define tightly coupled modulation and error encoding schemes. However, the principles shown below are applicable to both a more constrained, table-based configuration and a configuration that does not tightly couple modulation and coding scheme variables.

portion of the power transmitted by the client station is used to transmit system overhead such the fast feedback channel, acknowledgments, ranging, and the like. The power used for overhead is not available for transmission of data and must be subtracted from the maximum output power to determine the power available for the transmission of data.

Client station 114b reports to base station 110a the normalized transmission power used by client station 114b for recent transmissions in an uplink transmission report (UTR.) Base station 110 uses the maximum output power level, the information in the uplink transmission report, and information about the overhead messaging, and the like, to determine the power available for transmission of data ($P_{available}$).

To determine the modulation and coding scheme, base station 110a must determine which mapped pair(s) will support the requested data load and corresponding required CINR under current operating conditions, as limited by the power available for transmission of data. For example, in one aspect, the modulation and coding selector module 990 at base station 110a selects the mapped pair by sequentially calculating Equation 8 below to determine which mapped

TABLE 1

Modulation and Coding Scheme Pairs

| ROW | QUANTITY OF ALLOCATION UNITS (K) | MODULATION AND CODING SCHEME PAIR | REQUIRED CINR TO SUPPORT THE MAPPED PAIR (DB) | DATA LOAD IN BITS |
|---|---|---|---|---|
| 1 | 1 | QPSK, ½ rate, repetition (rep) 2 | −1.0 | 120 |
| 2 | 1 | QPSK, ½ rate | 2.0 | 240 |
| 3 | 1 | QPSK, ¾ rate | 5.0 | 360 |
| 4 | 1 | 16 QAM, ½ rate | 7.5 | 480 |
| 5 | 1 | 16QAM, ¾ rate | 11.2 | 720 |
| 6 | 2 | QPSK, ½ rate, rep 2 | −1.0 | 240 |
| 7 | 2 | QPSK, ½ rate | 2.0 | 480 |
| 8 | 2 | QPSK, ¾ rate | 5.0 | 720 |
| 9 | 2 | 16 QAM, ½ rate | 7.5 | 960 |
| 10 | 2 | 16QAM, ¾ rate | 11.2 | 1440 |
| 11 | 3 | QPSK, ½ rate, rep 2 | −1.0 | 360 |
| 12 | 3 | QPSK, ½ rate | 2.0 | 720 |
| 13 | 3 | QPSK, ¾ rate | 5.0 | 1080 |
| 14 | 3 | 16 QAM, ½ rate | 7.5 | 1440 |
| 15 | 3 | 16QAM, ¾ rate | 11.2 | 2160 |
| 16 | 4 | QPSK, ½ rate, rep 2 | −1.0 | 480 |
| 17 | 4 | QPSK, ½ rate | 2.0 | 960 |
| 18 | 4 | QPSK, ¾ rate | 5.0 | 1440 |
| 19 | 4 | 16 QAM, ½ rate | 7.5 | 1920 |
| 20 | 4 | 16QAM, ¾ rate | 11.2 | 2880 |
| 21 | 5 | QPSK, ½ rate, rep 2 | −1.0 | 600 |
| 22 | 5 | QPSK, ½ rate | 2.0 | 1200 |
| 23 | 5 | QPSK, ¾ rate | 5.0 | 1800 |
| 24 | 5 | 16 QAM, ½ rate | 7.5 | 2400 |
| 25 | 5 | 16QAM, ¾ rate | 11.2 | 3600 |

Client station 114b can vary its transmission power and does not always transmit at the maximum output power level at which it is capable. It is typically advantageous for client station 114b to limit its transmission power in order to limit the interference it causes in the system and to conserve battery power. Thus, base station 110 sets client station 114b transmission power to a level that can support the selected modulation and coding scheme combination but that is not unnecessarily high. Moreover, the maximum output power level at which a client station can transmit is determined by the type of client station as well as several other factors. For example, a handheld device typically has a lower maximum output power level to conserve battery power. On the other hand, a stationary device, which is often connected to an external power source, typically has a greater maximum output power level in order to achieve better performance. In addition, some pairs satisfy that equation. Mapped pairs that satisfy Equation 8 can be effectively used by client station 114b to transmit data over uplink 116b. Mapped pairs which do not satisfy Equation 8 cannot be used to effectively transmit data over uplink 116b because client station 114b cannot transmit using the mapped pair at a sufficiently high transmit power to achieve an acceptable data error rate.

$$10 \log(N_{subcarrier} K) + (CINR(K,MCS) + ENIP_{UL\text{-}predicted}) \leq P_{available}(dBm) \quad \text{Equation 8,}$$

wherein:

log(n) is the base-10 logarithm function;

$N_{subcarrier}$ is the quantity of subcarriers in an allocation unit;

K is the quantity of allocation units (e.g., column 2 of Table 1);

CINR(K,MCS) is the required CINR (e.g., column 4 of Table 1) at the quantity, K, of allocation units (e.g., column 2 of Table 1) and at the modulation and coding scheme (e.g., column 3 of Table 1) correspond to the mapped pair in question, in units of decibels (dB);

$ENIP_{UL-predicted}$ is the predicted uplink ENIP in units of dBm at the time the modulation and coding scheme is selected; and $P_{available}$ is the power available for transmission of data from the client station 14b, in units of dBm.

For example, let us assume there are 24 subcarriers in each allocation unit (i.e., $N_{subcarrier}$=24), that the current $ENIP_{UP-predicted}$ is −4.24 dBm, and that the power available for transmitting is 200 milliwatts (mW), which is equivalent to $P_{available}$=23 dBm. Let us further assume, that client station 114b requested resources to send 1000 bits. Beginning with the first mapped pair, K is set equal to 1 and CINR(K,MCS) is set equal to −1 according to the values given in the first row of Table 1.

Continuing to sequentially step through each row of Table 1, rows 1-9, 11-14, 16-18, and 21-23 each satisfy Equation 8. In this example, the modulation and coding selector module at base station 110a eliminates from consideration mapped pairs of Table 1 not satisfying Equation 8. In the example given above, rows 10, 15, 19, 20, 24 and 25 are eliminated.

From any remaining mapped pairs not eliminated, the modulation and coding selector module selects the mapped pair having the lowest number of allocation units capable of supporting the data load requested by an allocation request from client station 114b. In the example given above, only rows 13, 14, 18, 22, and 23 are capable of supporting the requested 1000 bit load. Because rows 13 and 14 require the use of only 3 allocation units, the modulation and coding scheme selector module 990 eliminates rows 18, 22 and 23, which require the use of 4 or more allocation units.

If there are a plurality of mapped pairs having the lowest number of allocation units capable of supporting the data load requested, in one aspect, the modulation and coding selector module at base station 110a selects the mapped pair with the most robust modulation and coding scheme, such as a lower-order modulation and/or a higher amount of error encoding to increase the probability of successful transmission. For example, in the example given above, the modulation and coding scheme module would select row 13, which specifies a more robust modulation and coding scheme than row 14.

In other aspects, the modulation and coding selector module 990 at base station 110a selects the mapped pair with the most efficient modulation and coding scheme. In the example given above, the modulation and coding scheme module selects row 14, which specifies a more efficient modulation and coding scheme than row 13. In some systems, an unused portion of the allocation unit is released for use by another client station.

When no mapped pair supports the data load requested in the allocation request from client station 114b, base station 110a selects the mapped pair that satisfies Equation 8 and carries the greatest data load. Although the above describes first eliminating the mapped pairs not satisfying Equation 8 and then selecting the mapped pair with the lowest allocation unit capable of supporting the requested data load, the modulation and coding selector module 990 at base station 110a can instead eliminate the mapped pairs of Table 1 not supporting the data load requested by the allocation request and then make a final selection from any remaining mapped pairs satisfying Equation 8.

Once the mapped pair is selected from Table 1, base station 110a provides (e.g., by sending a message to client station 114b via downlink 116a) the selected mapped pair to be used by client station 114b when transmitting data via uplink 116b.

Figure 4:
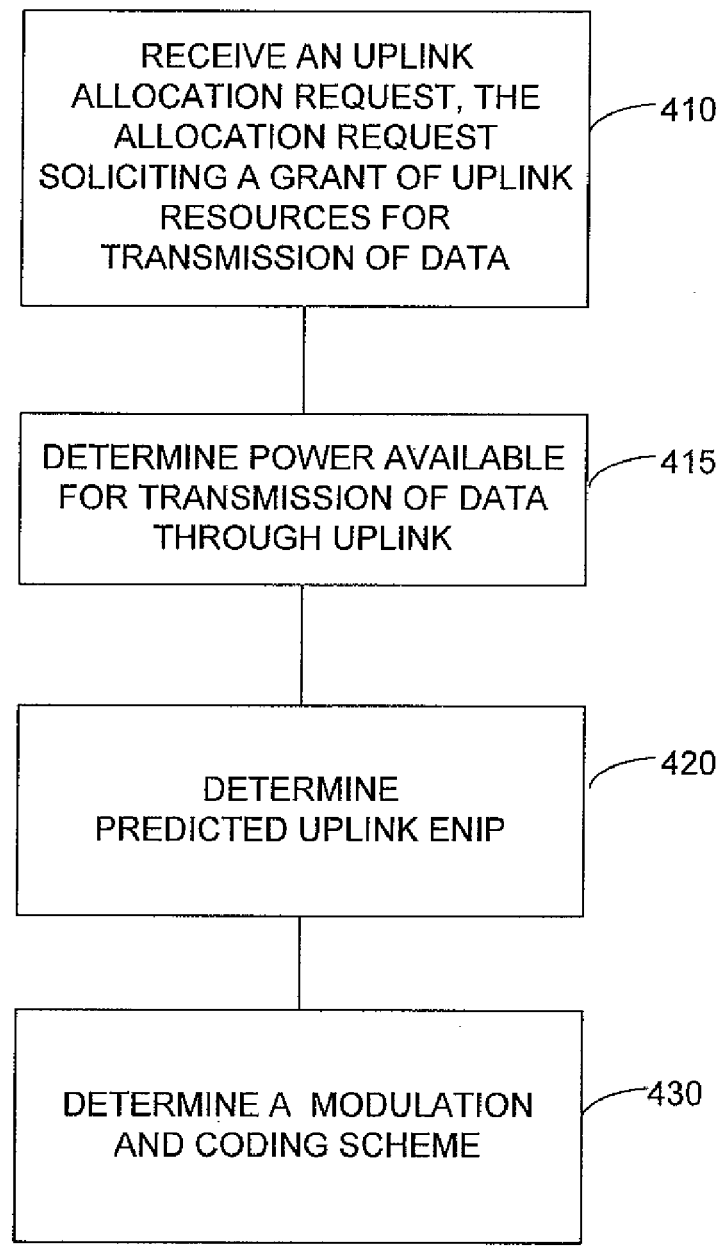
FIG. 4 depicts a process 400 for determining a modulation and coding scheme of an uplink based on predicted uplink ENIP.

FIG. 4 depicts an exemplary process 400 for determining, based on predicted uplink ENIP, a modulation and coding scheme. FIG. 9 depicts a block diagram of an exemplary base station, such as base station 110a. FIGS. 4 and 9 are used below to illustrate exemplary aspects consistent with the invention.

At 410, base station 110a receives from client station 114b an allocation request for uplink 116b. The allocation request solicits a grant of a resource on uplink 116b to enable client station 114b to transmit data via uplink 116b.

For example, whenever client station 114b has data to send to base station 110a, client station 114b sends an allocation request to receive an allocation of resources, typically indicating the quantity of data ready for transmission on uplink 116b. The uplink message is received by base station 110a via antenna 920 and radio interface 940. Radio interface 940 converts the wireless link signal to a decoded digital signal and provides it to receiver module 992, which in turn extracts the carried information and provides corresponding information to the various components within the base station 110a. For example, receiver 992 provides information with respect to the allocation request to modulation and coding selector module 990.

At 415, base station 110a determines a power available for data transmission through uplink 116b. For example, base station 110a uses the maximum output power level for client station 114b, the normalized transmit power, and information about overhead messaging, and the like to determine the power available for transmission of data ($P_{available}$). Typically, the maximum output power level for client station 114b is received over uplink 116a at the time that client station 114b first enters the coverage area of base station 110a. The maximum output power level is received over radio interface module 940, parsed by receiver 992, and stored in modulation and coding selector module 990. Typically, the normalized transmission power used by client station 114b during a previous frame as well as other channel characteristic information for the downlink and uplink are also received over radio interface module 940, parsed by receiver 992, and stored in modulation and coding module 990. Information about the power needed to carry overhead messaging is determined by modulation and coding selector module 990.

At 420, base station 110a determines the predicted uplink ENIP of uplink 116b, as described above with respect to process 200.

At 430, base station 110a determines, based on predicted uplink ENIP and Equation 8, a mapped pair to be used by client station 114b to transmit a frame of data. The mapped pair comprises the modulation and coding scheme and the number of allocation units that is to be assigned to client station 114b. In some aspects, whenever client station 114b sends an allocation request to base station 110a, the modulation and coding selector module 990 at base station 110a selects, based on the predicted uplink ENIP and Equation 8, a mapped pair, such as one of the mapped pairs listed in Table 1. Although process 400 describes selecting a mapped pair, the modulation and coding selector module at base station 110a can select, based on predicted uplink ENIP, one or more of the modulation, the coding, and the quantity of allocation units. Moreover, although process 400 is described with respect to ENIP, other parameters, such as NCCP may be used as well.

Figure 5:
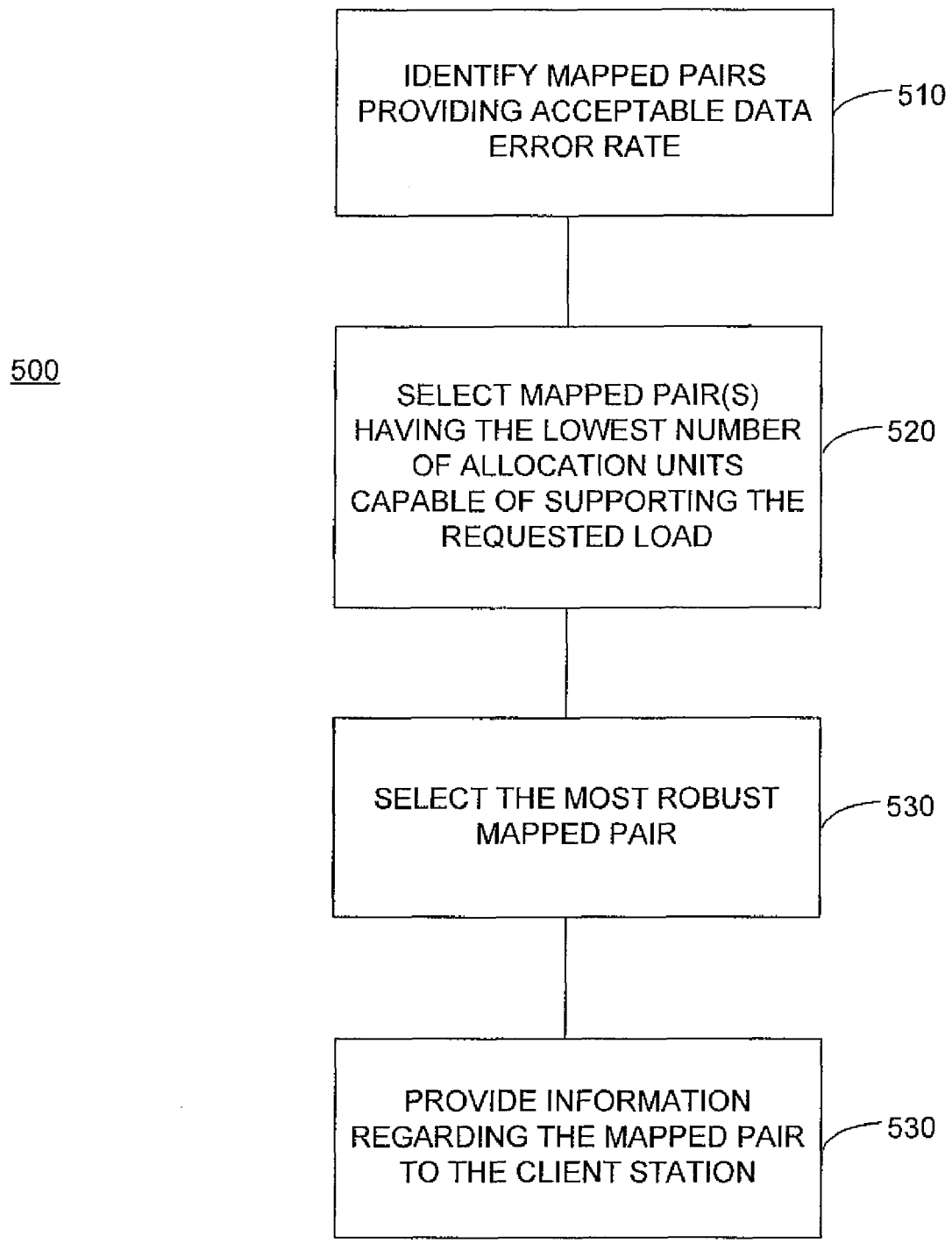
FIG. 5 depicts a process 500 for determining a modulation and coding scheme of an uplink by selecting from a plurality of modulation and coding schemes.

FIG. 5 depicts an exemplary process 500 for selecting a mapped pair comprising a modulation and coding scheme and a quantity of allocation units. In some implementations, process 500 is used to determine the mapped pair as part of 430 above.

At 510 the modulation and coding selector module 990 at base station 110a identifies the mapped pairs that can be used to transmit data over uplink 116b at an acceptable data error rate under current operating conditions. For example, the modulation and coding selector module 990 uses the stored values for the predicted uplink ENIP, power available for transmission, the required CINR associated with each mapped pair, and the like to identify the mapped pairs (e.g., using Equation 8 above). The CINR associated with each mapped pair is typically stored in modulation and coding selector module 990 in a format similar to Table 1, although other formats may be used as well.

At 520, the modulation and coding selector module 990 at base station 110a eliminates one or more mapped pairs identified in step 510. For example, modulation and coding selector module 990 selects the mapped pair(s) having the lowest number of allocation units capable of supporting the data load requested by an allocation request from client station 114b. If no identified mapped pair supports the requested data load, the modulation and coding scheme selector module 990 selects the identified mapped pair carrying the greatest data load.

If the selection made in 520 yields more than one mapped pair, at 530, the modulation and coding selector module 990 at base station 110a selects a mapped pair which is the most robust, thus selecting the preferred modulation and coding scheme which will be used over the air. For example, according to the order shown in Table 1, the modulation and coding selector 990 selects the mapped pair having the lowest row number, which in this example represents the most robust mapped pair. In another aspect, the modulation and coding selector module at base station 110a selects the mapped pair with the most efficient modulation and coding scheme.

At 540, the base station 110a provides the selected mapped pair to the client station. For example, modulation and coding selector module 990 sends an indication of the selected mapped pair to transmitter 996. Transmitter 996 sends a message including the selected mapped pair by transmitting via radio interface 940 and antenna 920 over the downlink 116a to client station 114b.

As noted above, the normalized channel characteristic power (NCCP) provides an absolute measure of the noise and interference power independent of the power in the carrier. A specific NCCP parameter is the equivalent noise interference power (ENIP). However, there are other factors beside noise and interference, which affect the performance of the link. The phrase "supplemental channel characteristics" refers to channel characteristics that are not typically associated with noise and interference. For example, supplemental channel characteristics include mutipath, fading, Doppler, path loss, and the like. The supplemental compensation factor, determined using Equation 6 above, can be used to compensate for supplemental channel characteristics. However, Equation 6 above is just one way to determine a supplemental compensation factor. Once determined, the supplemental compensation factor can be used to adjust the predicted uplink ENIP to account for supplemental channel characteristics, as was done in Equation 5 by the use of the offset compensation factor ($ENIP_{offset}$). The offset compensation factor ($ENIP_{offset}$) is one specific type of supplemental compensation factor. Although the description of supplemental compensation factor uses examples implementing ENIP, other parameters, such as NCCP, may be used as well.

If the client station is moving rapidly, the client station needs a more robust modulation and coding scheme to achieve the same performance as it would if it were stationary. Likewise, if the client station is located in a high multipath environment (e.g., in a large city environment surrounded by skyscrapers), the client station needs a more robust modulation and coding scheme to achieve the same performance as it would if it were in a less multipath prone environment. In these and other cases, the supplemental compensation factor can be used to adjust the predicted uplink ENIP for adverse supplemental channel characteristics, so that a more robust modulation and coding scheme is selected to achieve the desired performance. The supplemental compensation factor can also be used to adjust the predicted uplink ENIP for favorable supplemental channel characteristics, so that a more efficient modulation and coding scheme is selected—freeing system resources for use by other client stations.

As noted above, noise and interference levels vary between the uplink and downlink. For example, the noise figure can be different for the equipment at the base station and the client station. On the uplink, the most common source of interference is typically other client stations located in close proximity to the base station. On the other hand, on the downlink, the most common source of interference is typically from neighboring base stations when a client station is near the edge of a coverage area. Although the difference between the noise and interference characteristics of the uplink and the noise and interference characteristics of the downlink can be substantial, the supplemental channel characteristics typically remain somewhat equivalent across the uplink and the downlink for both time division duplex (TDD) and frequency division duplex (FDD) systems. For example, the speed at which the client station is moving and the multipath environment in which the client station is located are typically the same for the uplink and the downlink. Because the supplemental channel characteristics are consistent for the uplink and the downlink, the supplemental compensation factor is typically consistent for both the uplink in the downlink. As such, a supplemental compensation factor can determined for the uplink, the downlink, or a combination of the two. The supplemental compensation factor can then be used to determine the predicted ENIP and the modulation and coding scheme for the uplink, the downlink, or both. Moreover, the supplemental compensation factor can also be determined using uplink performance data, downlink performance data, or by combining the uplink performance data and the downlink performance data.

In some aspects, base station 110a determines, based on downlink performance data, the supplemental compensation factor to enable determination of the predicted NCCP for use in the modulation and coding scheme selection, or other transmission parameter, for the downlink, the uplink, or both. Base station 110a can also determine, based on uplink performance data, the uplink supplemental compensation factor to enable determination of the predicted NCCP for use in the selection of the modulation and coding scheme used on the uplink, the downlink, or both. Base station 110a can also determine, based on a combination of uplink and downlink performance data, the supplemental compensation factor to enable determination of the predicted uplink NCCP and/or predicted downlink NCCP, and the modulation and coding scheme for use on the downlink, uplink, or both.

The supplemental compensation factor can be determined in a variety of ways, one of which is using downlink performance data. For example, the supplement compensation factor can be calculated using Equations 6 and 7 with downlink performance data rather than uplink performance data. Both uplink performance data and downlink performance data can also be used together to determine the supplemental compensation factor. For example, using Equations 6 and 7, $N_{Goodn}$ is the number of successfully received data blocks for both the uplink and the downlink data blocks received in one frame. $N_{Total}$ is the total number of received data blocks for both the uplink and the downlink in one frame. Thus, the performance of the uplink and the downlink is combined, which can yield a more accurate indication of the supplemental channel characteristics. When uplink and downlink data are combined to determine the supplemental compensation factor, it is referred to as a "combined supplemental compensation factor."

To further illustrate the supplemental compensation factor, when client station 114b uploads a large amount of data (e.g., client station 114b provides a large set of digital photos to a storage provider via uplink 116b and base station 110a), client station 114b sends much more data via uplink 116b when compared to the data received by client station 114b via downlink 116a. In this case, a supplemental compensation factor calculated based on uplink performance data or on a combination of uplink and downlink performance data is more likely to be accurate than a supplemental compensation factor calculated based primarily on downlink performance data. On the other hand, if client station 114b downloads a large amount of data via downlink 116a, client station 114b receives more information via downlink 116a, while transmitting little (if any) information over uplink 116b. In this case, a supplemental compensation factor calculated based on downlink performance data or on a combination of uplink and downlink performance data is more likely to be accurate than a supplemental compensation factor calculated based primarily on uplink performance data. In each of these examples, the supplemental compensation factor can be determined and used to determine predicted ENIP and the modulation and coding scheme for the downlink, uplink, or both.

Figure 6:
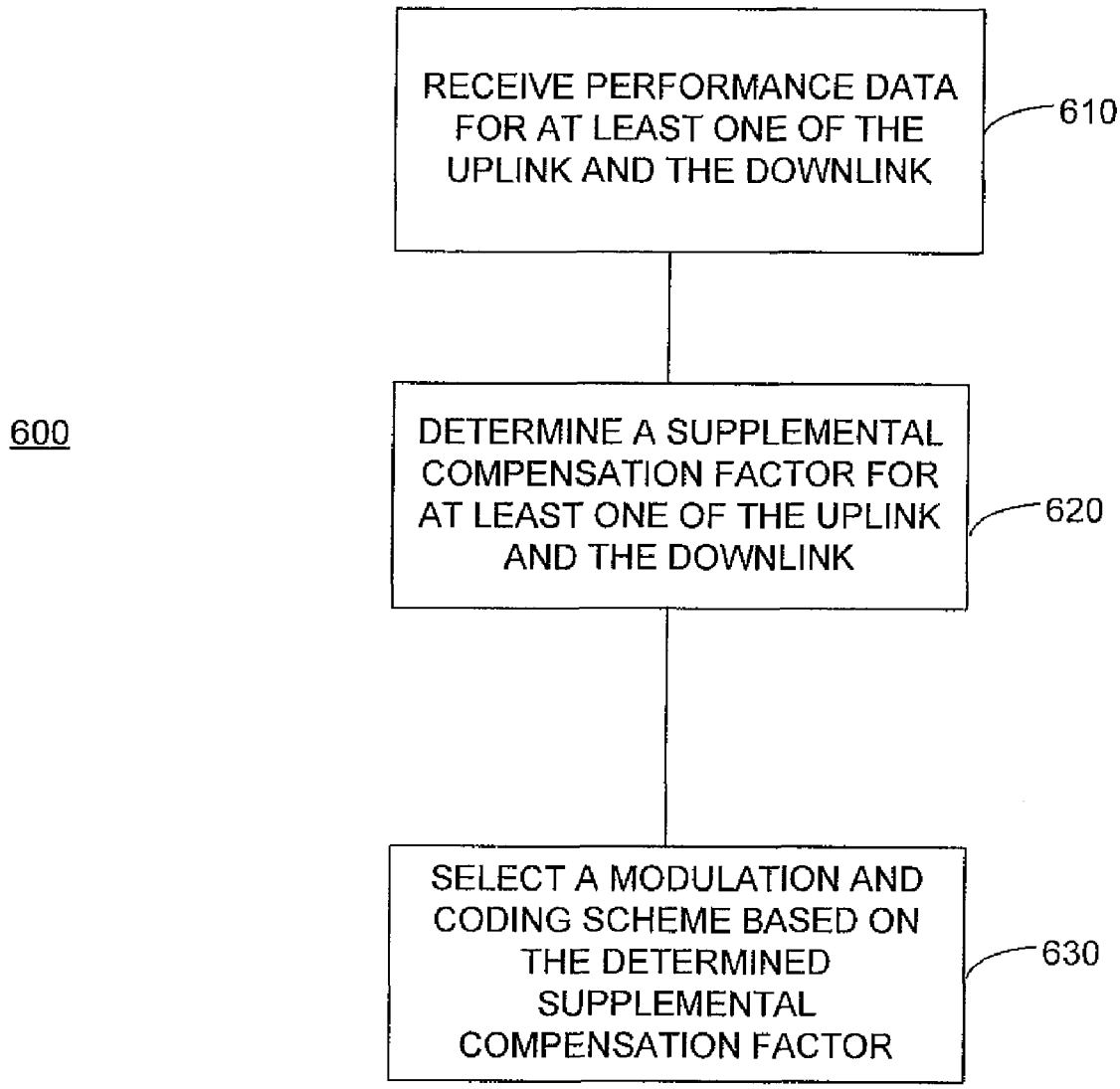
FIG. 6 depicts a process 600 for using a supplemental compensation factor.

FIG. 6 depicts an exemplary process 600 for using the supplemental compensation factor.

At 610, data is received regarding the performance of an uplink, downlink, or a combination of the two. For example, the modulation and coding F selector module 990 at base station 110a receives performance data, such as the number of successfully received data blocks ($N_{Goodn}$) and the total number of received data blocks ($N_{Total-n}$) as determined by receiver 992. For example, in the case of a HARQ system, the receiver 992 can count the number of successfully received packets to determine the uplink performance. For the downlink, the receiver 992 counts the number of requests for retransmission and provides this number to modulation and coding selector module 990, while the transmitter 996 provides modulation and coding selector module 990 with the total number of data blocks transmitted. Moreover, the performance data (e.g., $N_{Goodn}$ and $N_{Total-n}$) can be received for data transmitted via the downlink 116a, the uplink 116b, or a combination of both. Although the performance data is described in terms of data block, any other indicator of performance may be used as well.

In the case of a non-HARQ data connection, a cyclic redundancy check (CRC) can be appended to a packet sent over the link in order to detect errors. The performance data (e.g., $N_{Goodn}$ and $N_{Total-n}$) can be determined from the number of errors detected by the CRC. Although CRC provides error detection and thus an indication of performance, the CRC increases the size of the packet and the corresponding resources that must be expended to transmit the longer packet. For example, in the case of IEEE 802.16, a non-HARQ packet that includes a CRC is about 145 bits long, while a VoIP (voice over Internet Protocol) packet not having CRC is about 120 bits long, thus increasing the resources that must be expended to support a VoIP link by almost 20%.

At 620, a supplemental compensation factor is determined. For example, the modulation and coding selector module at base station 110a determines a supplemental compensation factor based on the performance data received in 610. For example, the supplemental compensation factor is determined using the combined uplink and the downlink HARQ data and Equations 6 and 7. When Equation 6 is used, $ENIP_{Offset}$ is the selected form of the supplemental compensation factor.

At 630, the modulation and coding selector module at base station 110a uses the determined supplemental compensation factor to select at least one of a modulation and coding scheme and a quantity of allocation units (e.g., using processes 400 and 500) for either the downlink, the uplink, or both.

In some aspects, the modulation and coding selector module determines whether to append CRC to non-HARQ packets transmitted on the downlink 116a, uplink 116b, or both. Moreover, a CRC can be appended to the non-HARQ packets on only one of the downlink or the uplink—saving thus resources on the link without the appended CRC. In some cases, the supplemental compensation factor is, however, only determined for the one link on which the CRC is appended. The supplemental compensation factor is then used to determine the time-weighted error performance metric (e.g., as shown in Equation 7) and the corresponding supplement channel characteristic performance (e.g., as shown in Equation 6.)

The supplemental compensation factor can also be used to determine predicted downlink ENIP and select the modulation and coding scheme for the downlink. In the case of the downlink, Equation 8 above may be modified by using predicted downlink ENIP instead of predicted uplink ENIP and Equation 1 may be modified to add a supplemental compensation factor as follows:

$$ENIP_{DL\text{-}predicted} = P_{BS\text{-}per\text{-}tone} - CINR_{DL\text{-}measured} + ENIP_{Offset} \quad \text{Equation 9,}$$

wherein:

$ENIP_{DL\text{-}predicted}$ is the predicted downlink ENIP;

$P_{BS\text{-}per\text{-}tone}$ is transmission power per tone used by base station 110a when transmitting data to client station 114b;

$CINR_{DL\text{-}measured}$ is the measured downlink CINR; and $ENIP_{Offset}$ is the supplemental compensation factor.

Figure 7:
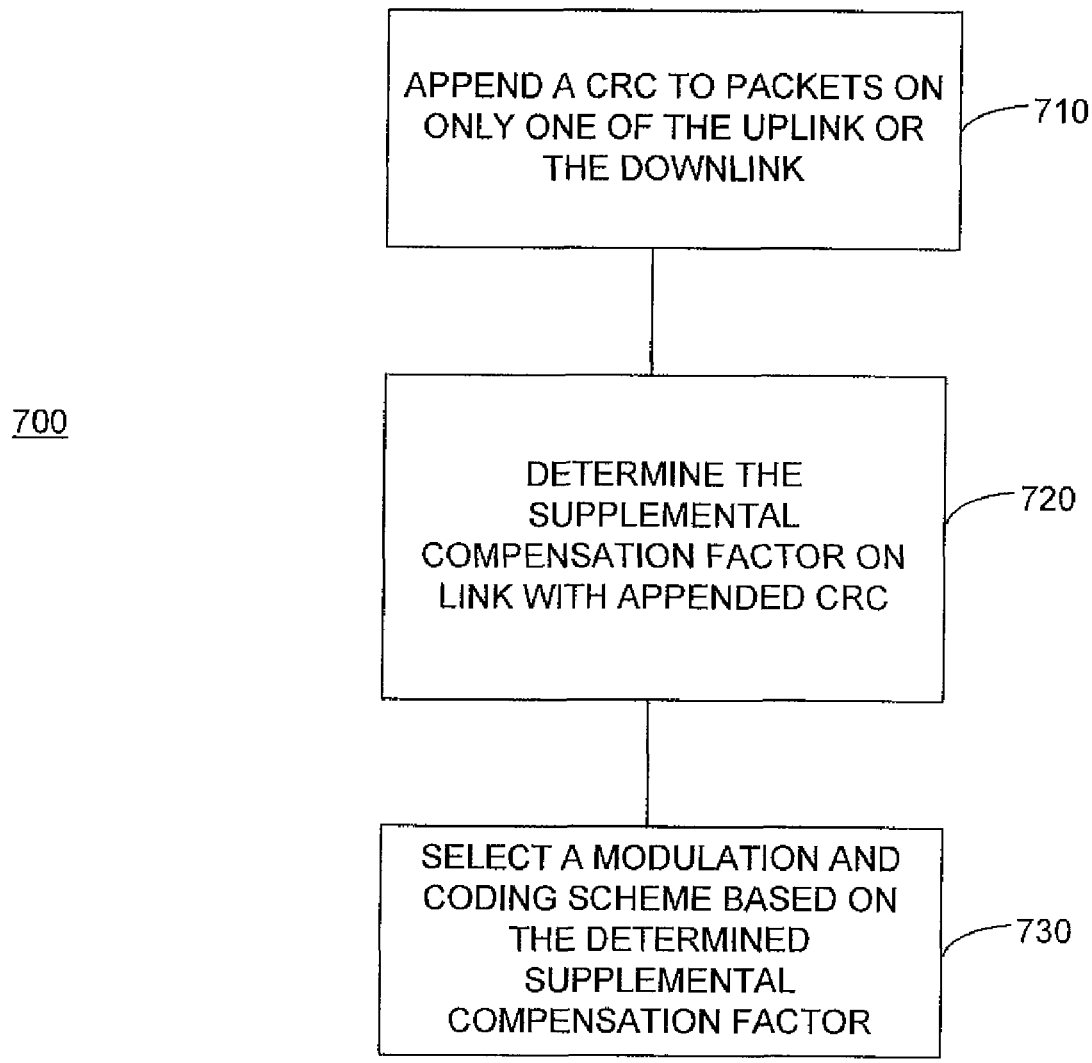
FIG. 7 depicts another process 700 for using a supplemental compensation factor.

FIG. 7 depicts another exemplary process 700 for using the supplemental compensation factor while using a non-HARQ connection.

At 710, a CRC is appended to packets, such as VoIP packets, sent on only one of the downlink 116a or the uplink 116b. In some cellular deployments, downlink performance limits the capacity and coverage area of the system. For this reason, in example that follows, we will assume that the CRC is appended only to uplink packets, although the CRC may also be appended to the downlink as well. Thus, the client station 114b appends a CRC to one or more packets transmitted via uplink 116b. By appending the CRC to packets on only the uplink, resources are more efficiently utilized when compared to appending the CRC to packets on both the uplink and the downlink.

At 720, the supplemental compensation factor is determined based on the statistical performance data for the link on which the CRC is being appended. Thus, the performance data can be determined as the ratio of packets not having CRC errors when received via uplink 116b at base station 110a (e.g., $N_{Good_n}$ of Equation 7) to the total number of packets (e.g., $N_{Total-n}$ of Equation 7) transmitted via uplink 116a. For example, the receiver 992 receives the non-HARQ packets and determines whether a CRC error has occurred. The receiver 992 provides the resulting statistical performance data to modulation encoding selector module 990. The modulation and coding selector module 990 then determines the supplemental compensation factor using the performance data obtained from the uplink. In some aspects, the supplemental compensation factor is determined as the $ENIP_{Offset}$ of Equation 6, although other approaches to determine the supplemental compensation factor may be used as well.

At 730, the modulation and coding scheme for the uplink and/or the downlink is selected based on the supplemental compensation factor determined from the CRC performance data. In the case of appending CRC to only uplink packets, the supplemental compensation factor is determined using the performance data of the uplink as described above at 720. For example, base station 110a may use Equation 9 above to determine predicted downlink ENIP. Moreover, base station 110a may use a modified version of Equation 8 (i.e., modified by using predicted downlink ENIP instead of predicted uplink ENIP) as well as processes 400 and 500 to determine the modulation and coding scheme of the downlink. The supplemental compensation factor may also be used to select the modulation and coding scheme of the uplink as described above with respect to processes 400 and 500.

Figure 8:
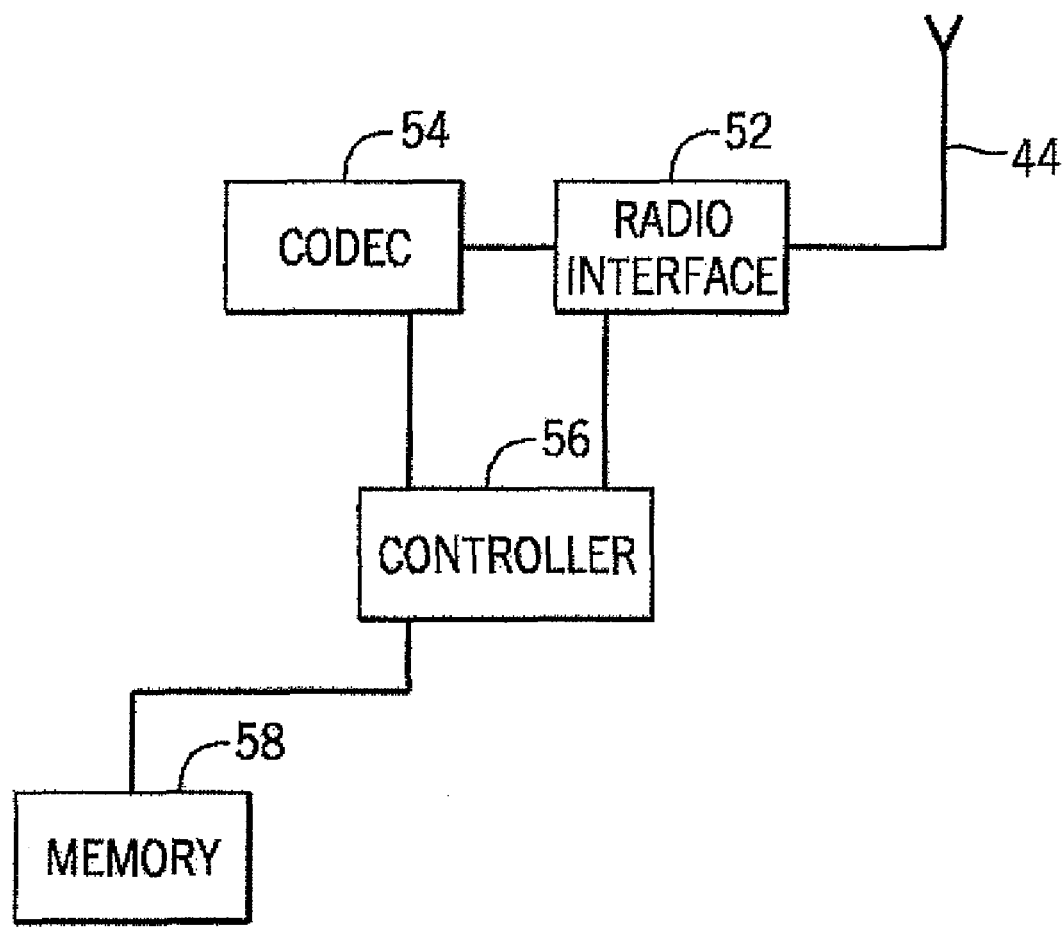
FIG. 8 depicts an example of a client station.

FIG. 8 depicts a block diagram of an exemplary client station, such as client station 114b, although other types of client stations may be used as well. Client station 114b includes an antenna 44, a radio interface 52, a codec 54, a controller 56, and memory 58. The client station 114b uses antenna 44 when communicating via downlink 116a and uplink 116b to a base station, such as base station 110a. Antenna 44 is coupled to radio interface 52, which is coupled to controller 56 and codec 54. Radio interface 52 receives an RF signal including an OFDMA signal and converts the RF signal into a digital format. Codec 54 serves as a coder or decoder of data. Controller 56 is a central processing unit for controlling client station 114b. Controller 56 can also include a processor capable of measuring CINR, reporting uplink power, appending a CRC to a packet, making an allocation request, controlling the modulation and coding used by radio interface 52, and performing one or more aspects of the processes described herein including Equations 1-9. Memory 58 may include code to implement one or more aspects of the subject matter described herein. Client station 114b (or one or more of the components therein) can be implemented using one or more of the following: a processor executing code, an application-specific integrated circuit (ASIC), a digital signal processor (DSP), an embedded processor, a field programmable gate array (FPGA), and the like.

FIG. 9 depicts a block diagram of an exemplary base station, such as base station 110a. The base station 110a includes an antenna 920 adapted to enable communication (e.g., receive from uplink 116b and transmit to downlink 116a) with one or more client stations, such as client station 114b. Base station 110a further includes a radio interface 940 for receiving an RF signal including an OFDMA carrier signal and converting the RF signal into a digital format and a transmitter 996 for processing messages set to client stations, setting downlink transmission power, and providing transmission information, such as the total number of transmitted data blocks, to other components of base station 110a. Base station 110a further includes a receiver module 992 for processing messages received from client stations and for providing performance statistics on received and/or transmitted data, a modulation and coding selector module 990 for selecting a modulation and coding scheme and the corresponding number of allocation units as well as determining other values (see, e.g., Equations 1-9), and a channel measurement module 994 for determining the channel characteristics of the uplink. Base station 110a (or one or more components therein) can be implemented using one or more of the following: a processor executing code, an application-specific integrated circuit (ASIC), a digital signal processor (DSP), an embedded processor, a field programmable gate array (FPGA), and the like.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power, wherein, when the second normalized channel characteristic power information is initially received, the determining further comprises including a contribution from the second normalized channel characteristic power that is greater than a contribution from the first normalized channel characteristic power.

2. The method of claim 1, wherein the determining further comprises:
reducing the contribution of the second normalized channel characteristic power and increasing the contribution of the first normalized channel characteristic power based on an increasing amount of time elapsed from when the second normalized channel characteristic power information is received.

3. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power based on the following equation:

$$ENIP_{UL-predicted-moving} = \left( \frac{\alpha(ENIP_{DL}) + (1-\alpha)e^{-\beta\tau}ENIP_{UL-measured}}{\alpha + (1-\alpha)e^{-\beta\tau}} + ENIP_{offset} \right),$$

wherein $ENIP_{UL-predicted-moving}$ represents the predicted normalized channel characteristic power of the uplink, $ENIP_{DL}$ represents the first normalized channel characteristic power, $ENIP_{UL-measured}$ represents the second normalized channel characteristic power, $ENIP_{offset}$ represents a compensation factor, $\beta$ represents a time decay, $\alpha$ represents a weighting factor, $e$ represents an exponential function, and $\tau$ represents an amount of time elapsed from when the second normalized channel characteristic power information is received.

4. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power based on the following equation:

$$ENIP_{UL-predicted-moving} = MIN\left( \frac{\alpha(ENIP_{DL}) + (1-\alpha)e^{-\beta\tau}ENIP_{UL-measured}}{\alpha + (1-\alpha)e^{-\beta\tau}} + ENIP_{offset}, ENIP_{UL-MAX} \right),$$

wherein $ENIP_{UL-predicted-moving}$ represents the predicted normalized channel characteristic power of the uplink, MIN represents a minimum function, $ENIP_{DL}$ represents the first normalized channel characteristic power, $ENIP_{UL-measured}$ represents the second normalized channel characteristic power, $ENIP_{offset}$ represents a compensation factor, $ENIP_{UL-MAX}$ represents a cap on the value of $ENIP_{UL-predicted-moving}$, $\beta$ represents a time decay, $\alpha$ represents a weighting factor, $e$ represents an exponential function, and $\tau$ represents an amount of time elapsed from when the second normalized channel characteristic power information is received.

5. The method of claim 4 further comprising:
determining the compensation factor by determining a performance parameter based on a cyclic redundancy check (CRC) appended to a group of downlink packets.

6. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power; and
determining the first normalized channel characteristic power associated with a downlink based on the following equation:

$$ENIP_{DL} = P_{BS-per-tone} - CINR_{DL-measured},$$

wherein $ENIP_{DL}$ represents the first normalized channel characteristic power, $P_{BS-per-tone}$ represents transmission power used by a base station, and $CINR_{DL-measured}$ represents a carrier to interference-plus-noise ratio (CINR) of the downlink.

7. The method of claim 6 further comprising:
determining the second normalized channel characteristic power based on the following equation:

$$ENIP_{UL-instant} = P_{UL-instant} - CINR_{UL-instant},$$

wherein $ENIP_{UL-instant}$ represents the second normalized channel characteristic power, $P_{UL-instant}$ represents an uplink transmission power per tone, and $CINR_{UL-instant}$ represents a carrier to interference-plus-noise ratio of the uplink.

8. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power; and determining, based on the predicted normalized channel characteristic power, at least one of a modulation and a coding to be used by a client station when transmitting data through the uplink to a base station.

9. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power; and
determining a modulation and a coding to be used by a client station to transmit data to a base station, the determination based on the following equation:

$$10 \log(N_{subcarrier} K) + (CINR(K,MCS) + ENIP_{UL\text{-}predicted}) > P_{available}(dBM),$$

wherein log represents a base-10 logarithm, $N_{subcarrier}$ represents a quantity of subcarriers in an allocation unit, K represents a quantity of allocation units, CINR(K,MCS) represents a carrier to interference-plus-noise ratio (CINR) to support a modulation and a coding, $ENIP_{UL\text{-}predicted}$ represents the predicted normalized channel characteristic power of the uplink, and $P_{available}$ represents available power for transmission of data.

10. The method of claim 9 further comprising:
selecting the modulation, the coding, and a quantity of allocation units.

11. A method comprising:
receiving information representative of a first normalized channel characteristic power associated with a downlink;
receiving information representative of a second normalized channel characteristic power associated with an uplink; and
determining a predicted normalized channel characteristic power of the uplink based on the first normalized channel characteristic power and the second normalized channel characteristic power,
wherein the determining further comprises determining a compensation factor by determining a performance parameter based on a cyclic redundancy check (CRC) appended to a group of downlink packets.

12. A system comprising;
a receiver configured to extract information from a wireless link; and
a modulation and coding selector configured to:
receive information from the receiver representative of a first normalized channel characteristic power associated with a downlink;
receive information representative of a second normalized channel characteristic power associated with an uplink;
determine a predicted normalized channel characteristic power of the uplink based on the first normalized channel characteristic power and the second normalized channel characteristic power,
wherein the modulation and coding selector is further configured to determine the predicted normalized channel characteristic power of the uplink using a contribution from the second normalized channel characteristic power that is greater than a contribution from the first normalized channel characteristic power when the second normalized channel characteristic power information is initially received and reduce the contribution of the second normalized channel characteristic power based on an increasing amount of time elapsed from when the second normalized channel characteristic power information is received.

13. The system of claim 12, wherein the modulation and coding selector is further configured to determine the predicted normalized channel characteristic power of the uplink based on a performance parameter derived from a cyclic redundancy check (CRC) appended to a group of downlink packets.

* * * * *